United States Patent [19]
Chen

[11] Patent Number: 5,816,641
[45] Date of Patent: Oct. 6, 1998

[54] SUN SHADING MEANS FOR CARS

[75] Inventor: Jye-Lai Chen, Yung Ho, Taiwan

[73] Assignee: Polyprise Incorporated, Taoyuan Hsien, Taiwan

[21] Appl. No.: 908,478

[22] Filed: Aug. 6, 1997

[51] Int. Cl.⁶ ........................................................ B60J 1/20
[52] U.S. Cl. ............................................ 296/95.1; 150/168
[58] Field of Search ................... 296/95.1, 136; 150/168

[56] References Cited

U.S. PATENT DOCUMENTS

| | | | |
|---|---|---|---|
| 2,614,630 | 10/1952 | Moszelt | 296/95.1 |
| 2,849,012 | 8/1958 | Cohen et al. | 396/136 |
| 4,049,036 | 9/1977 | Gebhardt | 296/95.1 |
| 4,799,728 | 1/1989 | Akers et al. | 296/136 |
| 5,456,515 | 10/1995 | Dang | 296/95.1 |

FOREIGN PATENT DOCUMENTS

| | | | |
|---|---|---|---|
| 210297 | 7/1960 | Austria | 296/95.1 |
| 1559176 | 1/1980 | United Kingdom | 296/95.1 |

*Primary Examiner*—Gary C. Hoge
*Attorney, Agent, or Firm*—Pro-Techtor International Services

[57] ABSTRACT

Disclosed is a sun shading means for cars mainly including four pieces of sun shades for respectively covering over front, left, rear, and right windows of a car. These sun shades are serially connected by upper and lower independently adjustable elastic fastening belts provided at their adjacent edges. Locating belts are separately connected to lower elastic fastening belts, so that hooks provided at free ends of the locating belts can be hooked onto lower edges of the car's body to firmly locate the whole sun shading means on the car. Two of the lower elastic fastening belts between the front and the left and the right windows pass below two rear view mirrors near two lower outer corners of the front window. Properly adjust the elastic belts shall allow the sun shades to completely and fitly cover windows at all four sides of the car to block all possible gaps through where sun shine may go into the car, and therefore an enhanced heat-insulation effect can be achieved.

3 Claims, 2 Drawing Sheets

SUN SHADING MEANS FOR CARS

BACKGROUND OF THE INVENTION

The present invention relates to a sun shading means for cars, and more particularly to a sun shading means for cars which is easily to handle and provides enhanced heat-insulation effect.

There are a variety of commercially available sun shades for cars. All these sun shades are mounted in cars to locally block sun shine from directly going into the cars. That is, these sun shades are usually attached by suckers to inner sides of car window glasses, particularly that of front and rear windows. This is the currently available best way for general car users to block sun shine from entering into cars via windows. These sun shades attached to front and rear window glasses can indeed block sun shine and improve the sweltering condition in cars. However, even these sun shades for cars are attached to window glasses to block sun shine, there are still gaps left between the sun shades and window glass surfaces as well as window frames. Heat absorbed by the window glasses shall still be transmitted into and accumulates in cars via these gaps without sun shades, making the interior of cars sweltering. Before the car users getting on the cars, they must open the doors, start the engine, and turn on the air conditioner to remove hot air inside the cars. By this way, a lot of energy is unnecessarily wasted. In other words, the currently available sun shades for cars and the way to use them are not complete nor effective in terms of heat insulation while a large amount of energy is wasted to reduce the heat accumulated in cars. It is therefore desirable to develop an improved sun shade for cars to eliminate the drawbacks found in conventional sun shades for cars that are not heat-insulation effective.

SUMMARY OF THE INVENTION

A primary object of the present invention is to provide a sun shading means for cars which provides complete and effective heat insulation, so that a car user does not need to open doors, start the engine and turn on air conditioner before he or she gets on the car.

The sun shading means for cars according to the present invention mainly includes four discrete sun shades separately covering onto front, left, rear, and right car windows. Every two adjacent sun shades of the present invention are adequately spacedly connected to one another by means of independently adjustable elastic fastening belts fixedly provided on edges of these sun shades. Moreover, locating belts with hooks provided to free ends are connected to lower elastic fastening belts. To use the sun shades of the present invention, separately put the four pieces of sun shades over outer surfaces of the front, left, rear, and right windows of the car. Fasten and adjust the elastic fastening belts between every two adjacent sun shades, so that the four pieces of sun shades fitly attach to the windows. Allow the lower fastening belts separately between the front piece and the left and the right pieces to pass below two rear view mirrors at two lower outer corners of the front window. Finally, let the hooks of the locating belts separately hook to lower edges of car body above four wheels. At this point, the front, left, rear, and right windows are completely fitly covered by the four pieces of sun shades. That is, any possible ways for the sun shine to directly go into the car are blocked to achieve a complete and enhanced heat insulation effect.

BRIEF DESCRIPTION OF THE DRAWINGS

The structure and the use of the present invention, as well as the effect thereof can be best understood by referring to the following detailed description of the preferred embodiments and the accompanying drawings, wherein.

DETAILED DESCRIPTION OF THE PREFERRED EMBODIMENTS

Figure 1:
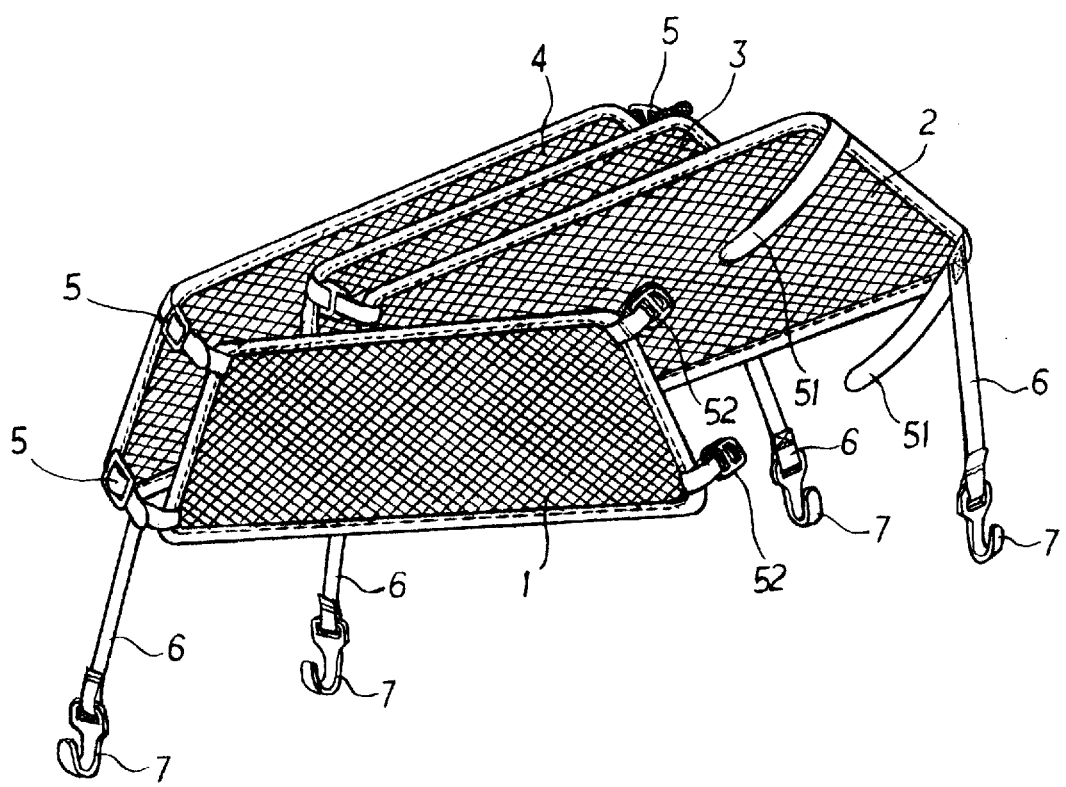
FIG. 1 is a perspective showing the sun shading means for cars according to the present invention.
Figure 2:
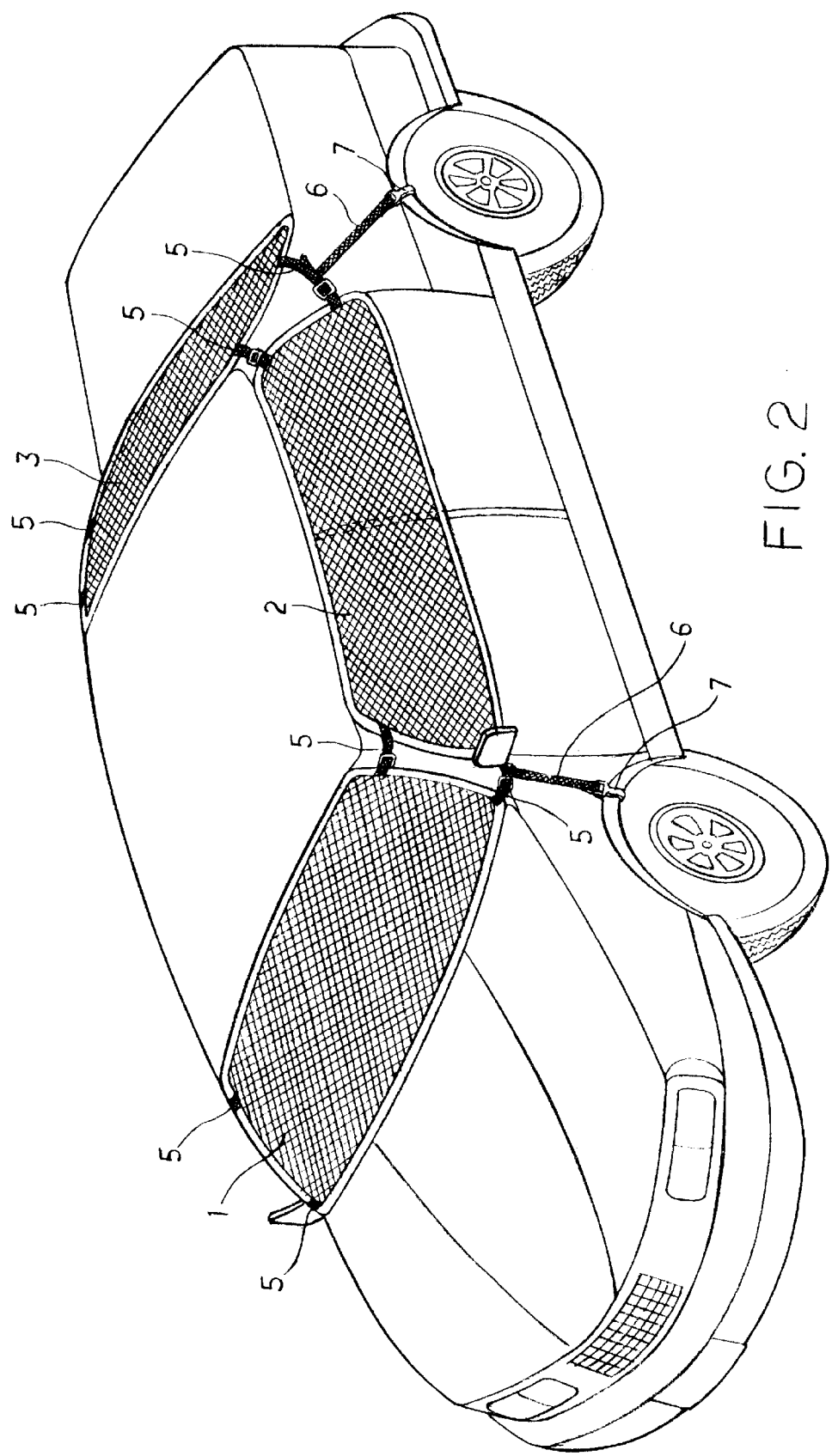
FIG. 2 illustrates a car with the sun shades of the present invention fitly covering over the front, left, rear, and right windows of the car.

Please refer to FIGS. 1 and 2. The sun shading means for cars according to the present invention mainly includes four pieces of sun shades, namely, a front, a left, a rear, and a right sun shade 1, 2, 3, and 4. These four sun shades 1, 2, 3, and 4 are serially connected by upper and lower elastic fastening belts 5 provided at their adjacent edges. These elastic fastening belts 5 are independently adjustable. Locating belts 6 are separately connected at one end to the lower elastic fastening belts 5. A hook 7 is connected to a free end of each locating belt 6. The locating belt 6 are preferably constructed from an elastic material.

In a preferred embodiment, the four sun shades 1, 2, 3, and 4 are formed with accordion pleats, so that they can be conveniently folded for storage when they are not in use.

Both the upper and lower elastic fastening belts 5 include a belt part 51 and a buckle part 52. Alternatively, each elastic fastening belt 5 may include two belt parts 51 to be connected together by one or two buckle parts 52 provided on one or two belt parts 51. In the case of two belt parts 51, one or both of them can be made of an elastic material.

When the sun shades according to the present invention are used to cover a car, separately put the front, left, rear, and right sun shades 1, 2, 3, and 4 over outer surfaces of front, left, rear, and right windows of the car. Connect the belt part or parts 51 and the buckle or buckles 52 of the elastic fastening belts 5 between every two adjacent sun shades. Separately adjust the belts 5 so that each sun shade is correctly and fitly located on the window. Let the lower elastic fastening belts 5 connecting the front sun shade 1 and the left and the right sun shades 2 and 4 pass below and thereby be firmly held by two rear view mirrors near two lower outer corners of the front window. Finally, pull the locating belts 6 until hooks 7 connected to the free ends of the locating belts 6 can be hooked to lower edges of the car body above four wheels. At this point, the four sun shades 1, 2, 3, and 4 completely and fitly cover the front, left, rear, and right windows of the car to block all possible gaps through where sun rays may pass into the car. Whereby, a complete and enhanced heat insulation effect can be achieved.

In other embodiment, the locating belts 6 may have increased or reduced numbers or be provided at different positions depending on actual needs. For instance, additional locating belts 6 can be separately provided at middle points of lower edges of the left and right sun shades 2 and 4. Or, in view that the lower fastening belts 5 between the front sun shade 1 and the left and the right sun shades 2, 4 have already been firmly held below the rear view mirrors, the locating belts 6 originally connected thereto can be optionally removed and changed to some other positions, such as suitable points at lower edges of these sun shades.

In a preferred embodiment, the sun shades 1, 2, 3, and 4 are constructed from plated polyester sheets and a laminated middle layer of foamed material. It is to be noted that other suitable heat-insulation materials are also acceptable for forming the sun shades of the present invention.

The sun shades of the present invention can be used not only in high-temperature areas for heat insulation but also in cold areas for shielding the car from cumulated snow. With the sun shades of the present invention covering over car windows, cumulated snow on the windows can be immediately cleared when the sun shades are removed from the windows.

The sun shades 1, 2, 3, and 4 of the present invention may also be tailored or customized to any particular version of car. To save costs for making and assembling the buckles 52, it is also possible to sew on the elastic fastening belts 51 directly to the sun shades after suitable distances have been measured and decided for every two adjacent sun shades, so that the sun shades of the present invention can be handled in a more simplified manner.

With the arrangements, the sun shades of the present invention can be tightly and fitly covered on outer surfaces of windows at all four sides of a car through adjustment of elastic fastening belts provided between every two adjacent sun shades and hooking locating belts onto lower edges of the car's body. Any possible gaps allowing sun shine to pass through and into the car can be completely blocked to achieve enhanced heat insulation effect and save a large amount of energy that is otherwise required to cool an interior of car that has been exposed to strong sun shine.

What is claimed is:

1. A sun shading means for cars, comprising a front, a left, a rear, and a right sun shade for respectively covering windows at front, left, rear, and right sides of a car; said sun shades being serially connected together by upper and lower independently adjustable elastic fastening belts provided at every two adjacent sun shade edges, such that said sun shades can be fitly attached to outer surfaces of said windows; said lower elastic fastening belt each having a locating belt connected thereto, said locating belts each having a hook connected to a free end thereof for hooking onto a lower edge of said car's body, so that said whole sun shading means is covered on said car without being easily moved.

2. A sun shading means for cars as claimed in claim 1, wherein said upper and lower elastic fastening belts comprise at least one belt part and at least one buckle part for connecting said at least one belt part together, and at least one of said at least one belt part being constructed from an elastic material.

3. A sun shading means for cars as claimed in claim 1, wherein said lower elastic fastening belts connecting said front sun shade to said left and said right sun shades pass below two rear view mirrors near two lower outer corners of said front window, forming two fixing points for covering said sun shading means on said car.

* * * * *